United States Patent
Li et al.

(10) Patent No.: US 12,430,577 B2
(45) Date of Patent: Sep. 30, 2025

(54) MOTIONAL MODE CONFIGURATION FOR IMPLEMENTATION OF ENTANGLING GATES IN ION TRAP QUANTUM COMPUTERS

(71) Applicant: IONQ, INC., College Park, MD (US)

(72) Inventors: Ming Li, Silver Spring, MD (US); Jason M. Amini, Takoma Park, MD (US); Yunseong Nam, North Bethesda, MD (US)

(73) Assignee: IONQ, INC., College Park, MD (US)

( * ) Notice: Subject to any disclaimer, the term of this patent is extended or adjusted under 35 U.S.C. 154(b) by 986 days.

(21) Appl. No.: 17/531,536

(22) Filed: Nov. 19, 2021

(65) Prior Publication Data
US 2022/0172095 A1  Jun. 2, 2022

Related U.S. Application Data

(60) Provisional application No. 63/119,235, filed on Nov. 30, 2020.

(51) Int. Cl.
*G06N 10/00* (2022.01)

(52) U.S. Cl.
CPC .................. *G06N 10/00* (2019.01)

(58) Field of Classification Search
CPC ................ G06N 10/00; G06N 10/40
See application file for complete search history.

(56) References Cited

U.S. PATENT DOCUMENTS

| | | | | |
|---|---|---|---|---|
| 11,379,750 | B2* | 7/2022 | Nam | B82Y 10/00 |
| 11,436,518 | B2* | 9/2022 | Nam | G21K 1/003 |
| 12,265,884 | B2* | 4/2025 | Blumel | G06N 10/40 |
| 2018/0114138 | A1* | 4/2018 | Monroe | G06N 10/70 |
| 2020/0369517 | A1 | 11/2020 | Nam et al. | |

FOREIGN PATENT DOCUMENTS

WO   WO-2019032106 A1 *  2/2019  ............. G06N 10/20

OTHER PUBLICATIONS

Lishman et al., "Trapped-ion entangling gates robust against qubit frequency errors," Phys. Rev. Research 2, 033117, Jul. 22, 2020, DOI:https://doi.org/10.1103/PhysRevResearch.2.033117. (Year: 2020).*
Blumel et al., "Power-optimal, stabilized entangling gate between trapped-ion qubits," arXiv: 1905.09292 [quant-ph], May 22, 2019, DOI: https://doi.org/10.48550/arXiv.1905.09292. (Year: 2019).*

(Continued)

*Primary Examiner* — Nicholas R. Pasko
(74) *Attorney, Agent, or Firm* — Patterson + Sheridan, LLP

(57) ABSTRACT

A method of performing a computation using a quantum computer includes modulating motional mode structures of a plurality of trapped ions, each of the plurality of trapped ions having two frequency-separated states defining a qubit, computing a detuning frequency function and an amplitude function of a laser pulse to cause entangling interaction between a pair of trapped ions of the plurality of trapped ions, and performing a quantum computation in the quantum computer by applying a laser pulse having the computed detuning frequency function and the amplitude function to the pair of trapped ions for a gate duration.

7 Claims, 11 Drawing Sheets

(56) References Cited

OTHER PUBLICATIONS

Grzesiak et al., "Efficient Arbitrary Simultaneously Entangling Gates on a trapped-ion quantum computer," arXiv: 1905.09294 [quant-ph], May 22, 2019, https://doi.org/10.48550/arXiv.1905.09294. (Year: 2019).*

Webb et al., "Resilient Entangling Gates for Trapped Ions," Phys. Rev. Lett. 121, 180501, Nov. 1, 2018, DOI: https://doi.org/10.1103/PhysRevLett.121.180501 (Year: 2018).*

Simon, "Measuring Trapped-Ion Motional Decoherence Through Direct Manipulation of Motional Coherent States," Massachusetts Institute of Technology, Jun. 2020. (Year: 2020).*

Figgatt et al., "Parallel entangling operations on a universal ion-trap quantum computer," Nature, vol. 572, Aug. 15, 2019, 368-372, DOI: https://doi.org/10.1038/s41586-019-1427-5. (Year: 2019).*

Choi et al., "Optimal quantum control of multimode couplings between trapped ion qubits for scalable entanglement," Phys. Review Lett., 112, 190502, 2014, DOI: 10.1103/PhysRevLett.112.190502. (Year: 2014).*

Leung et al., "Entangling an arbitrary pair of qubits in a long ion crystal," Phys. Rev. A 98, 032318, Sep. 18, 2018, DOI: 10.1103/PhysRevA.98.032318. (Year: 2018).*

PCT International Search Report and Written Opinion dated Sep. 5, 2022, for Internaitonal Application No. PCT/US2021/060090.

E. R. MacQuarrie, C. Simon, S. Simmons, and E. Maine, The emerging commercial landscape of quantum computing. Nat. Rev. Phys, 2, 596-598 (2020).

IBM Research. Quantum Experience. http://www.research.ibm.com/quantum, Accessed Nov. 16, 2020.

Rigetti. Amazon Bracket Hardware Provider. https://aws.amazon.com/braket/hardware-providers/rigetti/, Accessed Nov. 16, 2020.

IonQ. Amazon Bracket Hardware Provider. https://aws.amazon.com/braket/hardware-providers/ionq/, Accessed Nov. 16, 2020.

Honeywell System Model H1. https://www.honeywell.com/en-us/company/quantum/quantum-computer, Accessed Nov. 16, 2020.

K. Mølmer, A. Sørensen, Multiparticle Entanglement of Hot Trapped Ions, Phys. Rev. Lett. 82, 1835-1838 (1999).

K. Mølmer, A. Sørensen, Entanglement and Quantum computation with ions in thermal motion, Phys. Rev. A 62, 022311 (2000).

Y. Wu, S.-T. Wang, L.-M. Duan, Noise Analysis for High-Fidelity Quantum Entangling Gates in an Anharmonic Linear Paul Trap, Phys. Rev. A 97, 062325 (2018).

S.-L. Zhu, C. Monroe, L.-M. Duan, Arbitrary-speed quantum gates within large ion crystals through minimum control of laser beams, Europhys. Lett. 73, 485 (2006).

P. H. Leung, K. A. Landsman, C. Figgatt, N. M. Linke, C. Monroe, K. R. Brown, Robust 2-qubit gates in a linear ion crystal using a frequency-modulated driving force, Phys. Rev. Lett. 120, 020501 (2018).

T. J. Green, M. J. Biercuk, Phase-modulated decoupling and error suppression in qubit-oscillator systems, Phys. Rev. ett. 114, 120502 (2015).

R. Blumel, N. Grzesiak, and Y. Nam, Power-optimal, stabilized entangling gate between trapped-ion qubits, https://arxiv.org/abs/1905.09292 (2019).

Daniel C. Murphy, Kenneth R. Brown, Controlling error orientation to improve quantum algorithm success rates. Phys. Rev. A 99, 032318 (2019).

J.-S. Chen, K. Wright, N. C. Pisenti, D. Murphy, K. M. Beck, K. Landsman, J. M. Amini, and Y. Nam, Efficient-sideband-cooling protocol for long trapped-ion chains, Phys. Rev. A 102, 043110 (2020).

P. L. W. Maunz, High Optical Access Trap 2.0, Sandia National Laboratories Report No. SAND2016-0796R (2016).

* cited by examiner

1100

```
┌─────────────────────────────────────────────────────────────┐
│  MODULATE MOTIONAL MODE STRUCTURES OF A PLURALITY OF        │
│  TRAPPED IONS, EACH OF THE PLURALITY OF TRAPPED IONS HAVING │──1110
│  TWO FREQUENCY-SEPARATED STATES DEFINING A QUBIT            │
└─────────────────────────────────────────────────────────────┘
                              │
┌─────────────────────────────────────────────────────────────┐
│  COMPUTE A DETUNING FREQUENCY FUNCTION AND AN AMPLITUDE     │
│  FUNCTION OF A LASER PULSE TO CAUSE ENTANGLING INTERACTION  │──1120
│  BETWEEN A PAIR OF TRAPPED IONS OF THE PLURALITY OF TRAPPED │
│  IONS                                                       │
└─────────────────────────────────────────────────────────────┘
                              │
┌─────────────────────────────────────────────────────────────┐
│  PERFORM A QUANTUM COMPUTATION IN THE QUANTUM COMPUTER BY   │──1130
│  APPLYING A LASER PULSE HAVING THE COMPUTED DETUNING        │
│  FREQUENCY FUNCTION AND THE AMPLITUDE FUNCTION TO THE PAIR OF│
│  TRAPPED IONS FOR A GATE DURATION                           │
└─────────────────────────────────────────────────────────────┘
```

*Fig. 11*

MOTIONAL MODE CONFIGURATION FOR IMPLEMENTATION OF ENTANGLING GATES IN ION TRAP QUANTUM COMPUTERS

CROSS-REFERENCE TO RELATED APPLICATIONS

This application claims priority to U.S. Provisional Patent Application Ser. No. 63/119,235, filed on Nov. 30, 2020, which is incorporated by reference herein.

BACKGROUND

Field

The present disclosure generally relates to a method of generating an entangling gate in an ion trap quantum computer, and more specifically, to a method of constructing a simple laser pulse to generate the entangling gate with motional mode structures configured such that the pulse can be practically implemented.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process. Imperfect control of the qubits leads to errors that can accumulate over the computation process, limiting the size of a quantum computer that can perform reliable computations.

Among physical systems upon which it is proposed to build large-scale quantum computers, is a chain of ions (e.g., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a chain of trapped ions, which arise from their Coulombic interaction between the ions.

However, a series of laser pulses to perform computational processes in a large-scale quantum computation leads to technical complexity in optics and electronics for modulating such laser pulses. Thus, there is a need for a procedure to control qubits to perform a desired computation process with reduced complexity in physical systems.

SUMMARY

Embodiments of the present disclosure provide a method of performing a computation using a quantum computer. The method includes modulating motional mode structures of a plurality of trapped ions, each of the plurality of trapped ions having two frequency-separated states defining a qubit, computing a detuning frequency function and an amplitude function of a laser pulse to cause entangling interaction between a pair of trapped ions of the plurality of trapped ions, and performing a quantum computation in the quantum computer by applying a laser pulse having the computed detuning frequency function and the amplitude function to the pair of trapped ions for a gate duration.

Embodiments of the present disclosure also provide a non-volatile computer-readable medium including computer program instructions. The computer program instructions, when executed by a processor, cause the processor to compute a detuning frequency function and an amplitude function of a laser pulse to cause entangling interaction between a pair of trapped ions of a plurality of trapped ions, and perform a quantum computation in the quantum computer by applying a laser pulse having the computed detuning frequency function and the amplitude function to the pair of trapped ions for a gate duration. Motional mode frequencies of the plurality of trapped ions are modulated to be integer multiples of $4\pi$ divided by the gate duration.

Embodiments of the present disclosure further provide a quantum computing system. The quantum computing system includes a plurality of trapped ions in an ion trap, each of the trapped ions having two hyperfine states defining a qubit, and a controller comprising non-volatile memory having a number of instructions stored therein which, when executed by a processor, causes the quantum computing system to perform operations including computing a detuning frequency function and an amplitude function of a laser pulse to cause entangling interaction between a pair of trapped ions of the plurality of trapped ions, and performing a quantum computation in the quantum computer by applying a laser pulse having the computed detuning frequency function and the amplitude function to the pair of trapped ions for a gate duration. A confining potential of the ion trap is modulated such that motional mode frequencies of the plurality of trapped ions are integer multiples of $4\pi$ divided by the gate duration.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 11 depicts a flowchart illustrating a method 1100 used to perform a computation using a quantum computer.

Figure 1:
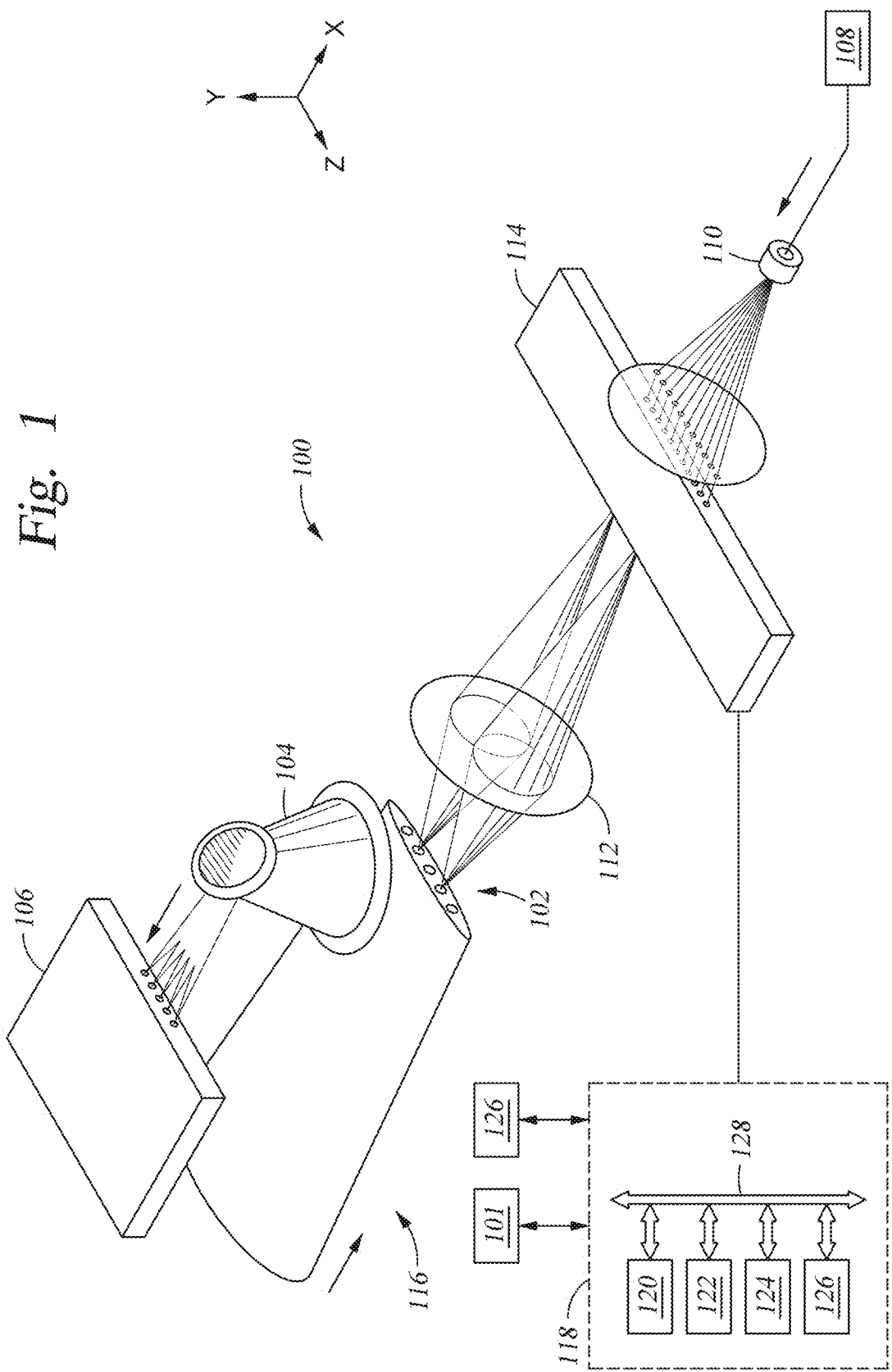
FIG. 1 is a partial view of an ion trap quantum computer according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method and a system for constructing and delivering a pulse to perform an entangling gate operation between two trapped ions during a quantum computation, and more specifically, to a method of designing a pulse that can be practically implemented in the system while simplifying the system complexity yet attaining the high fidelity of the entangling gate operation, or the high probability that at least two ions are in the intended qubit state(s) after performing the entangling gate operation between the two ions. It should be noted that although the method is described herein for the entangling gate operations between two ions, this method may also be used for single-qubit operations and entangling operations among more than two ions.

An overall system that is able to perform quantum computations using trapped ions will include a classical computer, a system controller, and a quantum register. The classical computer performs supporting and system control tasks including selecting a quantum algorithm to be run by use of a user interface, such as graphics processing unit (GPU), compiling the selected quantum algorithm into a series of universal logic gates, translating the series of universal logic gates into laser pulses to apply on the quantum register, and pre-calculating parameters that optimize the laser pulses by use of a central processing unit (CPU). A software program for performing the task of decomposing and executing the quantum algorithms is stored in a non-volatile memory within the classical computer. The quantum register includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer the pre-calculated parameters for pulses at the beginning of running the selected algorithm on the quantum register, controls various hardware associated with controlling any and all aspects used to run the selected algorithm on the quantum register, and returns a read-out of the quantum register and thus output of results of the quantum computation(s) at the end of running the algorithm to the classical computer.

The methods and systems described herein include processes for translating a logic gate into laser pulses that are applied to a quantum register, and also processes for pre-calculating parameters that optimize the laser pulses that are applied to the quantum register and used to improve the performance of the quantum computer.

Among several known sets of universal logic gates by which any quantum algorithm can be decomposed, a set of universal logic gates, commonly denoted as {R, XX}, is native to a quantum computing system of trapped ions described herein. Here, the R gate corresponds to manipulation of individual qubit states of trapped ions, and the) XX gate (also referred to as an "entangling gate") corresponds to manipulation of the entanglement of two trapped ions. For those of ordinary skill in the art, it should be clear the R gate can be implemented with near perfect fidelity, while the formation of the XX gate is complex and requires optimization for a given type of trapped ions, number of ions in a chain of trapped ions, and the hardware and environment in which the trapped ions are trapped, to name just a few factors, such that the fidelity of the XX gate is increased and computational errors within a quantum computer are avoided or decreased. In the following discussion, methods of generating and optimizing a pulse used to perform computations based the formation of an XX gate that has an improved fidelity will be described.

As the size of a quantum computer increases, the complexity of the entangling gate operations used to perform quantum computations increases, and the complexity of the pulses used to perform these entangling gate operations also increases. There may be practical limitations in implementing the pulses with increased complexity. The method and system described in this disclosure modify such pulses that can be practically implemented without scarifying accurate control of qubits.

General Hardware Configurations

FIG. 1 is a partial view of an ion trap quantum computer, or system 100, according to one embodiment. The system 100 includes a classical (digital) computer 101, a system controller 118 and a quantum register that is a chain 102 of trapped ions (i.e., five shown) that extend along the Z-axis. Each ion in the chain 102 of trapped ions is an ion having a nuclear spin I and an electron spin S such that a difference between the nuclear spin I and the electron spin S is zero, such as a positive ytterbium ion, $^{171}Yb^+$, a positive barium ion $^{133}Ba^+$, a positive cadmium ion ca or $^{113}Cd^+$, which all have a nuclear spin I=½ and the $^2S_{1/2}$ hyperfine states. In some embodiments, all ions in the chain 102 of trapped ions are the same species and isotope (e.g., $^{171}Yb^+$) In some other embodiments, the chain 102 of trapped ions includes one or more species or isotopes (e.g., some ions are $^{171}Yb^+$ and some other ions are $^{133}Ba^+$). In yet additional embodiments, the chain 102 of trapped ions may include various isotopes of the same species (e.g., different isotopes of Yb, different isotopes of Ba). The ions in the chain 102 of trapped ions are individually addressed with separate laser beams.

The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates ions at once. In some embodiments, individual Raman laser beams (not shown) each illuminate individual ions. The system controller (also referred to as a "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128. The RF controller 118 executes a control program which is stored in the ROM 122 or the storage unit 126 and uses the RAM 124 as a working area. The control program will include one or more software applications that include program code (e.g., instructions) that may be executed by a processor in order to perform various functionalities associated with receiving and analyzing data and controlling any and all aspects of the methods and hardware used to create the ion trap quantum computer system 100 discussed herein.

Figure 2:
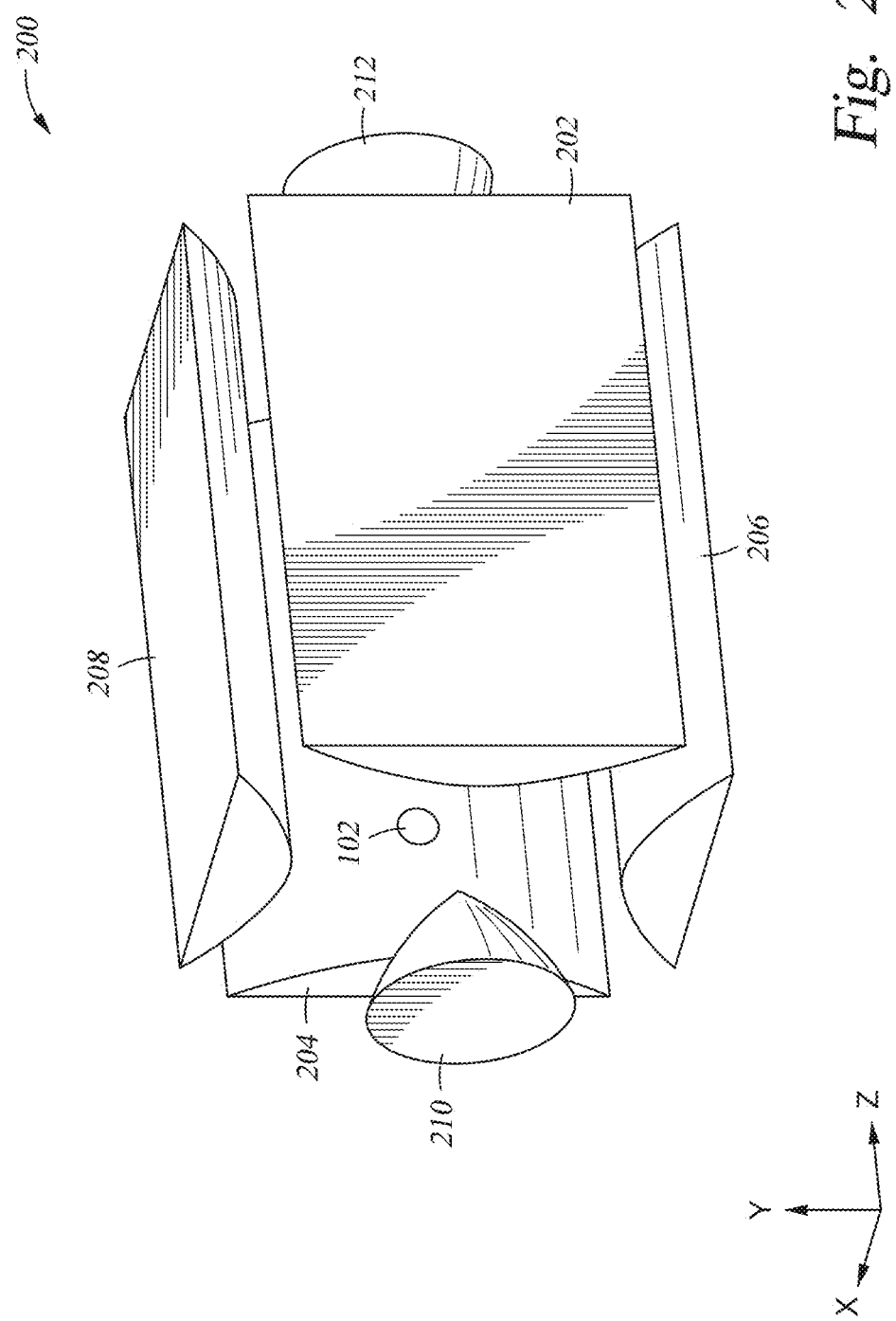
FIG. 2 depicts a schematic view of an ion trap for confining ions in a chain according to one embodiment.

FIG. 2 depicts a schematic view of an ion trap 200 (also referred to as a "Paul trap") for confining ions in the chain 102 according to one embodiment. The confining potential is exerted by both static (DC) voltage and radio frequency (RF) voltage. A static (DC) voltage $V_S$ is applied to end-cap electrodes (also referred to as the "DC control electrodes") 210 and 212 to confine the ions along the Z-axis (also referred to as an "axial direction," "longitudinal direction," or "first direction"). The ions in the chain 102 are nearly evenly distributed in the axial direction due to the Coulomb interaction between the ions. In some embodiments, the ion trap 200 includes four hyperbolically-shaped electrodes (also referred to as the "RF rails") 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction," "transverse direction," or "second direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as "secular motion") with a restoring force towards the saddle point in the radial direction and can be modeled by spring constants $k_x$ and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

It should be noted that the particular example of a conventional macroscopic ion trap illustrated in FIG. 2 is just a possible example of an ion trap for confining ions and does not limit the possible configurations, specifications, or the like of an ion trap according to the present disclosure. For example, an ion trap may be a micro-fabricated surface trap in which the necessary electromagnetic confining potential to trap ions is formed above a surface of a semiconductor chip. Examples of such surface traps include the Sandia high-optical access (HOA) 2.0 trap and the GTRI/Honeywell ball-grid array (BGA) trap, both known in the art. It is known that such micro-fabricated surface traps provide better ability to design the geometry of the ion trap and configure various parameters the electromagnetic confining potential with high repeatability and fabrication yield, as compared to a manually assembled macroscopic ion trap.

Trapped Ion Configuration and Quantum Bit Information

Figure 3A:
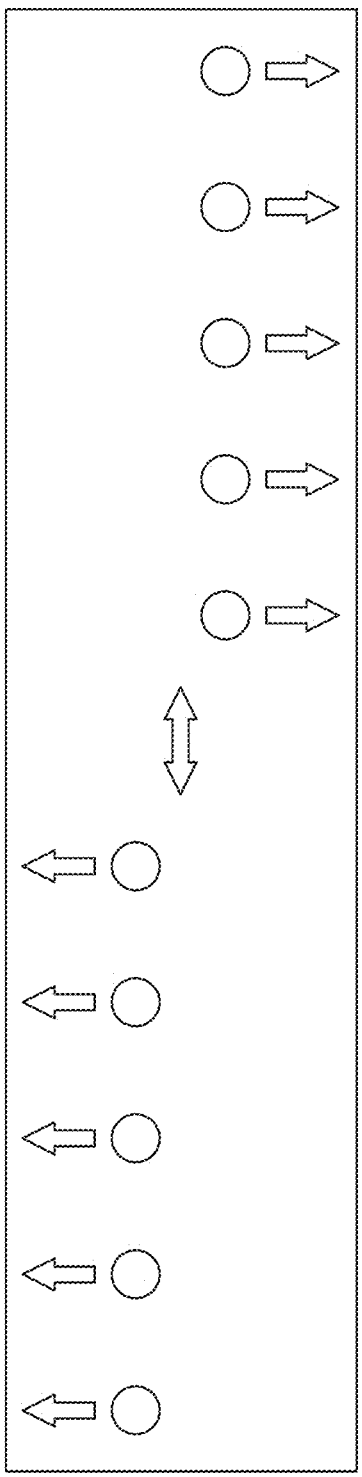
FIGS. 3A, 3B, and 3C depict a few schematic collective transverse motional mode structures of a chain of five trapped ions.
Figure 3B:
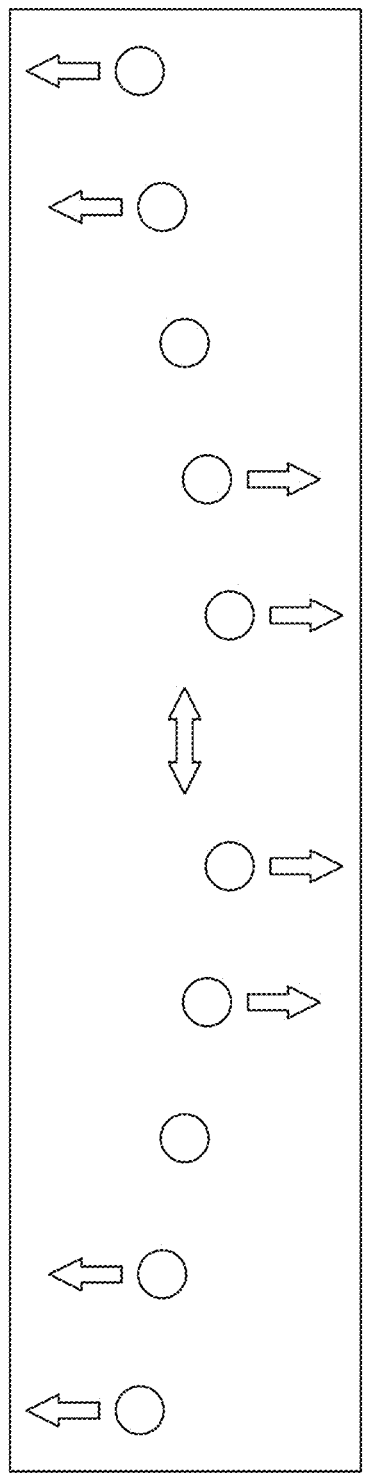
Figure 3C:
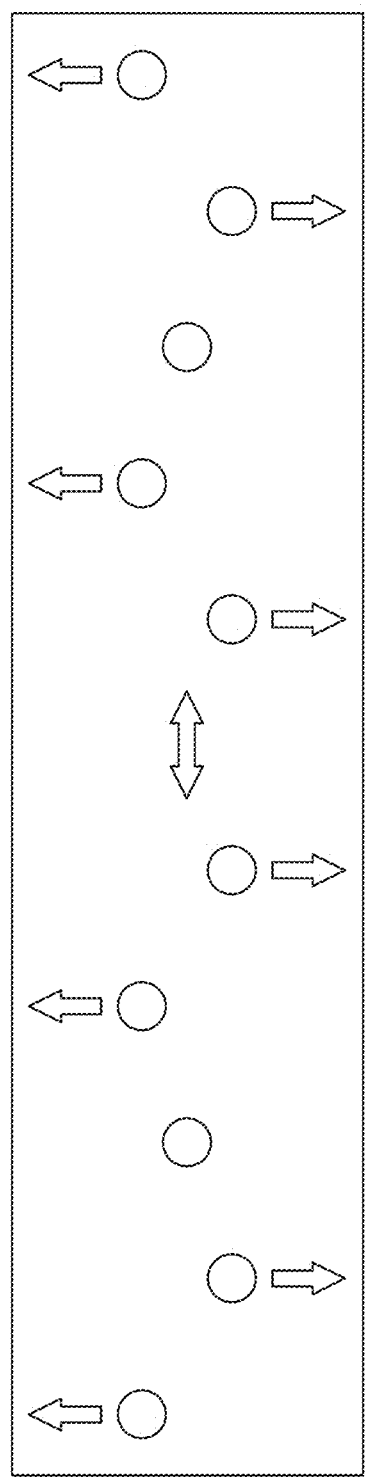

FIGS. 3A, 3B, and 3C depict a few schematic structures of collective transverse motional modes (also referred to simply as "motional mode structures") of a chain 102 of five trapped ions, for example. Here, the confining potential due to a static voltage $V_S$ applied to the end-cap electrodes 210 and 212 is weaker compared to the confining potential in the radial direction. The collective motional modes of the chain 102 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the p-th lowest energy (or equivalently, a mode frequency $\omega_p$) is hereinafter referred to as $|n_{ph}\rangle_p$, where $n_{ph}$ denotes the number of motional quanta (in units of energy excitation, referred to as "phonons") in the motional mode, and the number of motional modes P in a given transverse direction is equal to the number of trapped ions N in the chain 102. FIGS. 3A-3C schematically illustrate examples of different types of collective transverse motional modes that may be experienced by five trapped ions that are positioned in a chain 102. FIG. 3A is a schematic view of a common motional mode (also referred to as a "center-of-mass (COM) mode") $|n_{ph}\rangle_P$ having the highest energy, where P is both the number of the mode and the total number of motional modes. In the common motional mode $|n_{ph}\rangle_P$, all ions oscillate in phase in the transverse direction. FIG. 3B is a schematic view of a tilt motional mode (referred to simply as a "tilt mode") $|n_{ph}\rangle_{P-1}$ which has the second highest energy. In the tilt motional mode, ions on opposite ends move out of phase in the transverse direction (i.e., in opposite directions). FIG. 3C is a schematic view of a higher-order motional mode (also referred to as a "zigzag mode") $|n_{ph}\rangle_{P-3}$ which has a lower energy than that of the tilt motional mode $|n_{ph}\rangle_{P-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 4:
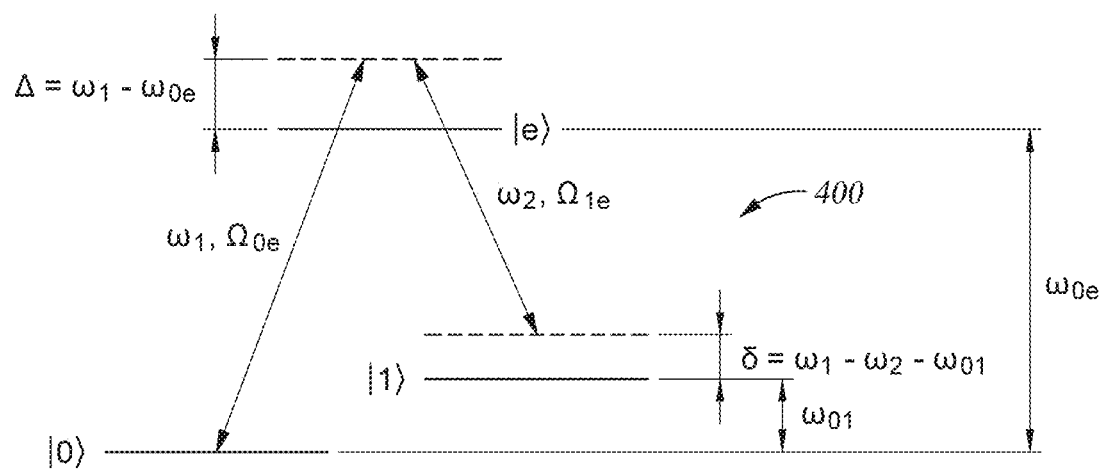
FIG. 4 depicts a schematic energy diagram of each ion in a chain of trapped ions according to one embodiment.

FIG. 4 depicts a schematic energy diagram 400 of each ion in the chain 102 of trapped ions according to one embodiment. Each ion in the chain 102 of trapped ions is an ion having a nuclear spin I and an electron spin S such that a difference between the nuclear spin I and the electron spin S is zero. In one example, each ion may be a positive ytterbium ion, $^{171}Yb^+$, which has a nuclear spin I=½ and the $^2S_{1/2}$ hyperfine states (i.e., two electronic states) with an energy split corresponding to a frequency difference (referred to as a "carrier frequency") of $\omega_{01}/2\pi$=12.642812 GHz. In other examples, each ion may be a positive barium ion $^{133}Ba^+$, a positive cadmium ion $^{111}Cd^+$ or $^{113}Cd^+$, which all have a nuclear spin I=½ and the $^2S_{1/2}$ hyperfine states. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_p$ for any motional mode p with no phonon excitation (i.e., $n_{ph}$=0) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_p$ with the subscript p denotes the motional ground state for a motional mode p of a chain 102 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 4, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1\omega_{0e}$, with respect to the transition frequency $\omega_{0e}$ between $|0\rangle$ and $|e\rangle$, as illustrated in FIG. 4. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, Mg+, and $Ba^+$) or transition metal ions ($Zn^+$, $Hg^+$, $Cd^+$).

Figure 5:
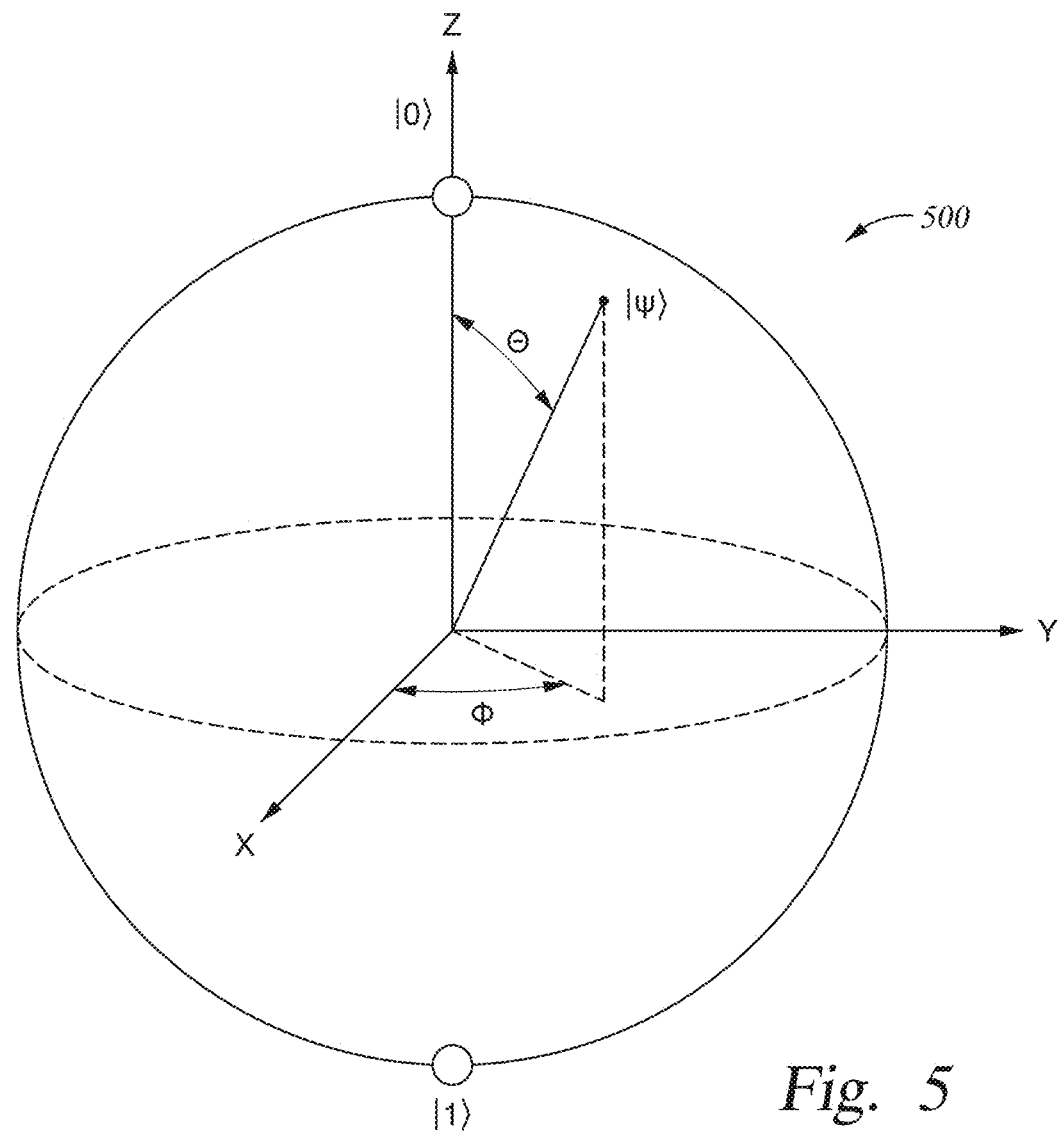
FIG. 5 depicts a qubit state of an ion represented as a point on a surface of the Bloch sphere.

FIG. 5 is provided to help visualize a qubit state of an ion, represented as a point on the surface of the Bloch sphere 500 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "π-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter for convenience) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "π/2-pulse". More generally, a superposition of the two qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and π, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

Figure 6A:
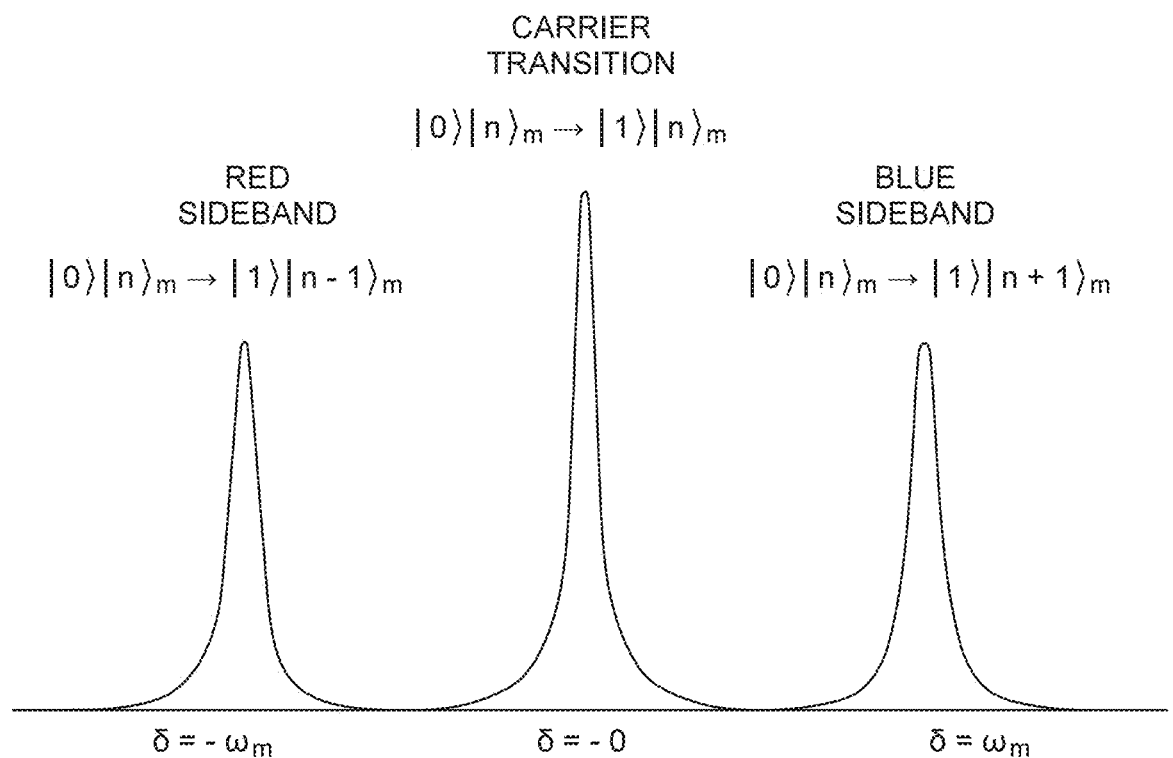
FIGS. 6A and 6B depict schematic views of motional sideband spectrum of each ion and a motional mode according to one embodiment.
Figure 6B:
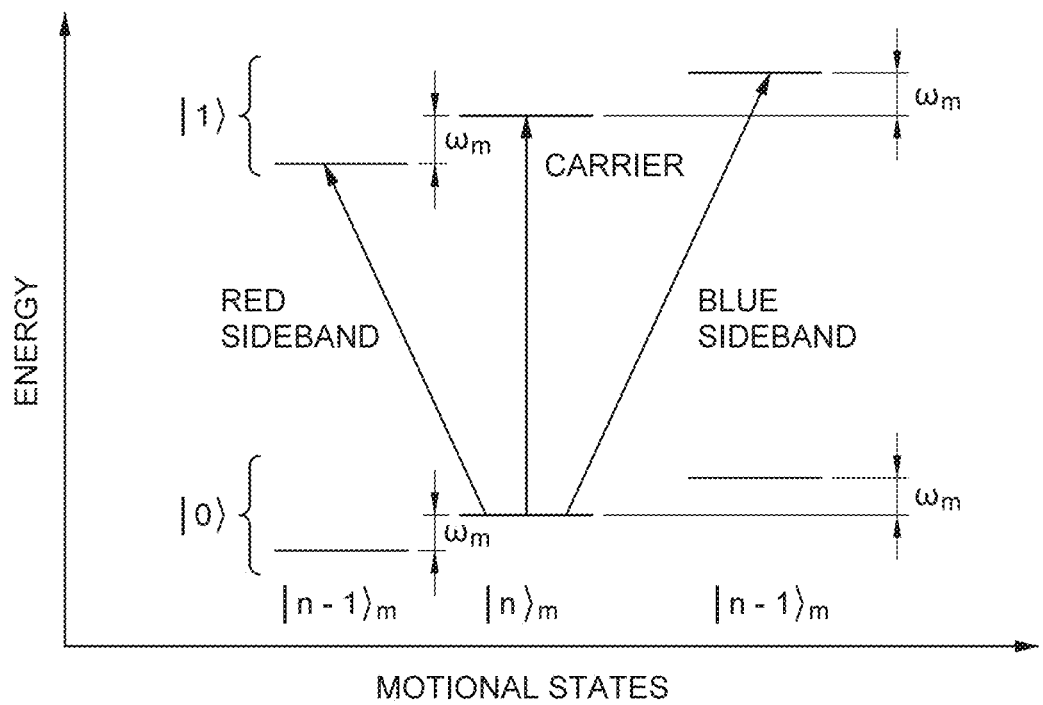

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the chain 102 in a motional mode $|n_{ph}\rangle_p$ having a mode frequency $\omega_p$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a "blue sideband"), Rabi flopping between combined qubit-motional states $|0\rangle|n_{ph}\rangle_p$ and $|1\rangle|n_{ph}+1\rangle_p$ occurs (i.e., a transition from the p-th motional mode with n-phonon excitations denoted by $|n_{ph}\rangle_p$ to the p-th motional mode with $(n_{ph}+1)$-phonon excitations denoted by $|n_{ph}+1\rangle_p$ occurs when the qubit state $|0\rangle$ flips to $|1\rangle$). When the detuning frequency of the composite pulse is negative (i.e., the frequency difference between the first and second laser beams is tuned lower than the carrier frequency by the mode frequency $\omega_p|n_{ph}\rangle_p$, $\delta=\omega_1-\omega_2-\omega_{01}=-\mu<0$, referred to as a "red sideband"), Rabi flopping between combined qubit-motional states $|0\rangle|n_{ph}\rangle_p$ and $|1\rangle|n_{ph}-1\rangle_p$ occurs (i.e., a transition from the motional mode $|n_{ph}\rangle_p$ to the motional mode $|n_{ph}-1\rangle_p$ with one less phonon excitations occurs when the qubit state $|0\rangle$ flips to $|1\rangle$). A π/2-pulse on the blue sideband applied to a qubit transforms the combined qubit-motional state $|0\rangle|n_{ph}\rangle_p$ into a superposition of $|0\rangle_p$ and $|1\rangle|n_{ph}+1\rangle_p$. A π/2-pulse on the red sideband applied to a qubit transforms the combined qubit-motional $|0\rangle|n_{ph}\rangle_p$ into a superposition of $|0\rangle|n_{ph}\rangle_p$ and $|1\rangle|n_{ph}-1\rangle_p$. When the two-photon Rabi frequency $\Omega(t)$ is smaller as compared to the detuning frequency $\delta=\omega_1-\omega_2-\omega_{01}=\pm\mu$ the blue sideband transition or the red sideband transition may be selectively driven. Thus, a qubit can be entangled with a desired motional mode by applying the right type of pulse, such as a π/2-pulse, which can be subsequently entangled with another qubit, leading to an entanglement between the two qubits. Entanglement between qubits is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and $|1\rangle_i|1\rangle_j$ as follows:

$$|0\rangle_i|0\rangle_j \rightarrow |0\rangle_i|0\rangle_j - i|1\rangle_i|1\rangle_j$$

$$|0\rangle_i|1\rangle_j \rightarrow |0\rangle_i|1\rangle_j - i|1\rangle_i|0\rangle_j$$

$$|1\rangle_i|0\rangle_j \rightarrow -i|0\rangle_i|1\rangle_j + |1\rangle_i|0\rangle_j$$

$$|1\rangle_i|1\rangle_j \rightarrow -i|0\rangle_i|0\rangle_j + |1\rangle_i|1\rangle_j.$$

For example, when the two qubits (i-th and j-th qubits) are both initially in the hyperfine ground state $|0\rangle$ (denoted as $|0\rangle_i|0\rangle_j$) and subsequently a π/2-pulse on the blue sideband is applied to the i-th qubit, the combined state of the i-th qubit and the motional mode $|0\rangle_i|n_{ph}\rangle_p$ is transformed into a superposition of $|0\rangle_i|n_{ph}\rangle_p$ and $|1\rangle_i|n_{ph}+1\rangle_p$, and thus the combined state of the two qubits and the motional mode is transformed into a superposition of $|0\rangle_i|0\rangle_j|n_{ph}\rangle_p$ and $|1\rangle_i|0\rangle_j|n_{ph}+1\rangle_p$. When a π/2-pulse on the red sideband is applied to the j-th qubit, the combined state of the j-th qubit and the motional mode $|0\rangle_j|n_{ph}\rangle_p$ is transformed to a superposition of $|0\rangle_j|n_{ph}\rangle_p$ and $|1\rangle_j|n_{ph}-1\rangle_p$ and the combined state $|0\rangle_j|n_{ph}+1\rangle_p$ is transformed into a superposition of $|0\rangle_j|n_{ph}+1\rangle_p$ and $|1\rangle_j|n_{ph}\rangle_p$.

Thus, applications of a π/2-pulse on the blue sideband on the i-th qubit and a π/2-pulse on the red sideband on the j-th qubit may transform the combined state of the two qubits and the motional mode $|0\rangle_i|0\rangle_j|n_{ph}\rangle_p$ into a superposition of $|0\rangle_i|0\rangle_j|n_{ph}\rangle_p$ and $|1\rangle_i|1\rangle_j|n_{ph}\rangle_p$, the two qubits now being in an entangled state. For those of ordinary skill in the art, it should be clear that two-qubit states that are entangled with a motional mode having a different number of phonon excitations from the initial number of phonon excitations $n_{ph}$ (i.e., $|1\rangle_i|0\rangle_j|n_{ph}+1\rangle_p$ and $|0\rangle_i|1\rangle_j|n_{ph}-1\rangle_p$) can be removed by a sufficiently complex pulse sequence, and thus the combined state of the two qubits and the motional mode after the XX-gate operation may be considered disentangled as the initial number of phonon excitations $n_{ph}$ in the p-th motional mode stays unchanged at the end of the XX-gate operation. Thus, qubit states before and after the XX-gate operation will be described below generally without including the motional modes.

More generally, the combined state of i-th and j-th qubits transformed by the application of the composite pulse on the sidebands for duration τ (referred to as a "gate duration"), having an amplitude function $\Omega(t)$ and a detuning frequency function $\mu(t)$, can be described in terms of an entangling interaction $\chi_{i,j}(\tau)$ as follows:

$$|0\rangle_i|0\rangle_j \rightarrow \cos(2\chi_{i,j}(\tau))|0\rangle_i|0\rangle_j - i\sin(2\chi_{i,j}(\tau))|1\rangle_i|1\rangle_j$$

$$|0\rangle_i|1\rangle_j \rightarrow \cos(2\chi_{i,j}(\tau))|0\rangle_i|1\rangle_j - i\sin(2\chi_{i,j}(\tau))|1\rangle_i|0\rangle_j$$

$$|1\rangle_i|0\rangle_j \rightarrow -i\sin(2\chi_{i,j}(\tau))|0\rangle_i|1\rangle_j + \cos(2\chi_{i,j}(\tau))|1\rangle_i|0\rangle_j$$

$$|1\rangle_i|1\rangle_j \rightarrow -i\sin(2\chi_{i,j}(\tau))|0\rangle_i|0\rangle_j + \cos(2\chi_{i,j}(\tau))|1\rangle_i|1\rangle_j$$

where, $$\chi_{ij} = \sum_{p=1}^{P} \eta_p^i \eta_p^j \int_0^\tau dt_2 \int_0^{t_2} dt_1 g(t_2) g(t_1) \sin[\omega_p(t_2-t_1)],$$

$\eta_p^{i,j}$ is the Lamb-Dicke parameter that quantifies the coupling strength between the i-th (the j-th) ion and the p-th motional mode having the mode frequency $\omega_p$, $g(t)$ is a pulse function defined as $g(t)=\Omega(t)\sin(\psi(t))$, $\psi(t)$ is an accumulated phase function (also referred to simply as a "phase function") $\psi(t)=\psi_0\int_0^t+\mu(t')\,dt'$ of the pulse, $\psi_0$ is an initial phase which may be assumed to be zero (0) hereinafter for simplicity without loss of generality, and P is the number of the motional modes (equal to the number N of ions in the chain 102).

Construction of Pulses for Entangling Gate Operations

The entanglement between two qubits (trapped ions) described above can be used to perform an XX-gate operation. The XX-gate operation (XX gate) along with single-qubit operation (R gate) forms a set of universal gates {R, XX} that can be used to build a quantum computer to perform desired computational processes. In constructing a pulse to deliver to the chain 102 of trapped ions for performing an XX-gate operation between two trapped ions (e.g., i-th and j-th trapped ions) in the chain 102, an amplitude function $\Omega(t)$ and a detuning frequency function $\mu(t)$ of the pulse are adjusted as control parameters to ensure the pulse performs the intended XX-gate operation, by imposing the following gate requirements.

Gate Requirement 1: First, to perform an XX-gate operation $XX(\theta_{ij})$ with a desired rotation angle $\theta_{ij}$ ($0<\theta_{ij}\leq\pi/2$), the entangling interaction $\chi_{ij}$ generated between i-th and j-th trapped ions by the pulse must equal the rotation angle $\theta_{ij}/4$. A fully entangling XX gate requires $\theta_{ij}=\pi/2$. This first requirement is also referred to as the requirement for non-zero entangling interaction.

Gate Requirement 2: Second, required laser power to implement the pulse may be minimized such that the constructed pulse is at an optimum power. This second requirement is also referred to as the requirement that the laser pulse has the lowest peak-power.

Gate Requirement 3: Third, all trapped ions in the chain 102 that are displaced from their initial positions as the motional modes are excited by the delivery of the pulse must return to the initial positions at the end of the XX-gate operation. This third requirement is also referred to as the requirement for ion-mode decoupling in which the trapped ions that are excited by the motional modes return to their original positions and momentum values.

However, a series of laser pulses constructed as described above to perform computational processes in a large-scale quantum computation creates a complex technical problem for the optics and electronics used for modulating such laser pulses. In the embodiments described herein, degrees of freedom in the design and fabrication of an ion trap for confining ions, such as the ion trap 102, are newly introduced in order to compensate for some of the added technical complexity in the optics and electronics. Therefore, it is desirable to design and fabricate an ion trap to modulate the confining potentials of the ion trap to configure the mode frequencies $\omega_p$ in a way that the constructed pulses are simplified. In some embodiments, a pulse is chosen to have certain symmetries, such as a phase of a pulse being reversed at a half-way point of a gate duration of the pulse, to make gate operations more robust. Thus, in constructing a pulse to be used to perform an XX-gate operation, the following configuration conditions are imposed.

Condition 1: The motional mode structures are modulated such that the mode frequencies $\omega_p$ are integer multiples of $4\pi/\tau$, with a small error $\delta k_p$, where τ is the gate duration and $k_p$ are positive integers (i.e., $\omega_p=4(k_p+\delta k_p)\pi/\tau$).

Condition 2: The pulse function $g(t)$ is chosen to have the symmetry $g(t+\tau/2)=-g(t)$ for $t\in[0,\tau/2]$. That is, the pulse is a combination of two consecutive pulse segments of the same shape (i.e., the same detuning frequency $\mu(t)$ and the same amplitude function $\Omega(t)$) but with opposite phases.

Condition 3: In one example, the pulse is further simplified by requiring the amplitude function $\Omega(t)$ of the pulse is constant $\Omega$ during the gate duration τ, and the detuning frequency function $\mu(t)$ of the pulse is an integer multiple of $2\pi/\tau$, $\mu(t)=2l\pi/\tau$, where l is a positive integer. That is, the pulse function is described as $$g(t) = \Omega \sin\left(\frac{2l\pi t}{\tau}\right)$$

for $t\in[0, \tau/2]$. Thus, the constant amplitude $\Omega$ of the pulse and the positive integer l determining the detuning frequency $\mu$ of the pulse are the control parameters to be adjusted in construing the pulse to be used to perform an XX-gate operation.

As described above, Gate Requirement 1 (also referred to as the requirement for non-zero entangling interaction) requires entangling interaction $\chi_{ij}$ generated between i-th and j-th trapped ions by the pulse have the rotation angle value $\theta_{ij}$ ($0<\theta_{ij}\leq\pi/2$).

With Conditions 1, 2, and 3 imposed, the entangling interaction $\chi_{ij}$ can be simplified as $$\chi_{ij} = \begin{cases} \dfrac{\Omega^2\tau^2}{2\pi}\sum_{p=1}^{P}\eta_p^i\eta_p^j\dfrac{k_p}{4k_p^2-l^2}, & \text{if } \nexists\, p=1,\cdots,P \text{ that } k_p = l/2, \\ \dfrac{\Omega^2\tau^2}{2\pi}\left(\eta_{p_l}^i\eta_{p_l}^j\dfrac{3}{8l} + \sum_{\substack{p=1\\p\neq p_l}}^{P}\eta_p^i\eta_p^j\dfrac{k_p}{4k_p^2-l^2}\right), & \text{if } \exists\, p=1,\cdots,P \text{ that } k_p = l/2, \end{cases}$$

where $p_l$ satisfies $2k_{p_l=l}$.

Gate Requirement 2 (also referred to as the requirement that the laser pulse has the lowest peak-power) requires, for a given set of Lamb-Dicke parameters $\eta_p^{i,j}$ and the mode frequencies $\omega_p$, the positive interger $l$ be chosen such that the constant amplitude $\Omega$ is the lowerest value to satisfy the requirement for non-zero entangling interaction. That is, the positive integer $l$ is chosen so that a gate power ratio defined by a dimensionless quantity $|\chi_{ij}/\Omega^2\tau^2|$ is maximized. Once the positive interger $l$ is chosen, the constant amplitude $\Omega$ can be computed based on Gate Requirement 1, $\chi_{ij}=\theta_{ij}/4$.

Gate Requirement 3 (also referred to as the requirement for the ion-mode decoupling) requires the trapped ions that are excited by the delivery of the pulse return to the initial positions. A residual coupling $\alpha$ of the p-th motional mode with the i-th and j-th trapped ions after application of the pulse for the gate duration $\tau$ is determined by the Lamb-Dicke parameters $\eta_p^{i,j}$, the pulse function $g(t)$ of the pulse, and the mode frequency $\omega_p$ of the p-th motional mode, and required to be less than an error budget of E such that the displacements of the i-th and j-th trapped ions from their initial positions in the phase spaces are limited, as $$\alpha = \dfrac{4}{5}\sum_{p=1}^{P}\coth\dfrac{\hbar\omega_p}{2k_BT_p}(\eta_p^{i2}+\eta_p^{j2})\left|\int_0^{\tau}g(t)e^{i(\omega_p t+\phi_p)}dt\right|^2 < \varepsilon,$$

where $\phi_p$ is an initial phase associated with the p-th motional mode at time $t=0$, $T_p$ is the temperature of the p-th motional mode, $\hbar$ is the reduced Planck constant, and $k_B$ is the Boltzmann constant.

With Conditions 1, 2, and 3 imposed, the residual coupling $\alpha$ can be simplified as $$\alpha = \begin{cases} \dfrac{l^2\Omega^2\tau^2}{5\pi^2}\sum_{p=1}^{P}\left[\coth\left(\dfrac{\hbar\omega_p}{2k_BT_p}\right)\right](\eta_p^{i2}+\eta_p^{j2})\left|\dfrac{e^{i\phi_p}(e^{4i\delta k_p\pi}-1)}{4(k_p+\delta k_p)^2-l^2}\right|^2, & \text{if } l \text{ is odd,} \\ \dfrac{l^2\Omega^2\tau^2}{5\pi^2}\sum_{p=1}^{P}\left[\coth\left(\dfrac{\hbar\omega_p}{2k_BT_p}\right)\right](\eta_p^{i2}+\eta_p^{j2})\left|\dfrac{e^{i\phi_p}(e^{2i\delta k_p\pi}-1)^2}{4(k_p+\delta k_p)^2-l^2}\right|^2, & \text{if } l \text{ is even.} \end{cases}$$

With the assumptions the motional modes are sufficiently cooled such that the average phonon number $\bar{n}_{ph}$ is less than 1 ($\bar{n}_{ph}<1$) by known laser cooling methods, such as Doppler cooling or resolved sideband cooling, and the initial phase $\phi_p$ associated with the p-th motional mode is zero for simplicity without loss of generality, the residual coupling $\alpha$ is bounded by $$\alpha < \begin{cases} \dfrac{2l^2\Omega^2\tau^2}{5\pi^2}\sum_{p=1}^{N}(\eta_p^{i2}+\eta_p^{j2})\left|\dfrac{e^{4i\delta k_p\pi}-1}{4(k_p+\delta k_p)^2-l^2}\right|^2, & \text{if } l \text{ is odd,} \\ \dfrac{2l^2\Omega^2\tau^2}{5\pi^2}\sum_{p=1}^{N}(\eta_p^{i2}+\eta_p^{j2})\left|\dfrac{(e^{2i\delta k_p\pi}-1)^2}{4(k_p+\delta k_p)^2-l^2}\right|^2, & \text{if } l \text{ is even,} \end{cases}$$

since $\coth\left(\dfrac{\hbar\omega_p}{2k_BT_p}\right) < 2$.

In the limit of the error $\delta k_p$ in the mode frequency $\omega_p$ being small (i.e., $|\delta k_p|\ll 1$), the upper bound of the residual coupling $\alpha$ can be expanded as a series of terms of different orders of the error $\delta k_p$, as $$\alpha <$$

$$\begin{cases} \dfrac{32l^2\Omega^2\tau^2}{5}\sum_{p=1}^{P}(\eta_p^{i2}+\eta_p^{j2})\dfrac{\delta k_p^2}{(4k_p^2-l^2)^2}+O(\delta k_p^3), & \text{if } l \text{ is odd,} \\ \alpha_0 + \dfrac{32l^2\Omega^2\tau^2\pi^2}{5}\sum_{\substack{p=1\\p\neq p_l}}^{P}(\eta_p^{i2}+\eta_p^{j2})\dfrac{\delta k_p^4}{(4k_p^2-l^2)^2}+O(\delta k_p^5), & \text{if } l \text{ is even,} \end{cases}$$

where $$\alpha_0 = \begin{cases} 0, & \text{if } \nexists\, p=1,\cdots,P \text{ that } k_p=l/2, \\ \dfrac{2\Omega^2\tau^2\pi^2}{5}(\eta_{p_l}^{i2}+\eta_{p_l}^{j2})\delta k_{p_l}^2+O(\delta k_p^3), & \text{if } \exists\, p=1,\cdots,P \text{ that } k_p=l/2. \end{cases}$$

It should be noted, for a given error budget $\varepsilon$ for the residual coupling $\alpha$, the required bound on the error $\delta k_p$ in the mode frequency $\omega_p$ is much less stringent for pulses with the positive integer $l$ being even than those with the positive interger $l$ being odd, if there is no motional mode $p$ that satisfies $k_p=l/2$. Thus, in some embodiments, the positive interger $l$ is chosen to be an even number.

It should be also noted that the pulses constructed in the methods described herein can readily be adapted to suppress crosstalk errors incurred with spectator ions that sit close to the ions a XX gate operation is intended to be operated on. A XX gate, $XX(\theta_{ij})$ may be implemented by the pulse satisfying Condition 2 as a combination of two XX gate $XX(\theta_{ij/2})$ and single-qubit gates. Due to Conditions 1 and 2, the entanglement rotation angles accumulated in the first half of the gate duration $\tau$ is already the same as accumulated in the second half of the gate duration $\tau$, i.e., $$\sum_{p=1}^{P} \eta_p^i \eta_p^j \int_0^{\frac{\tau}{2}} dt_2 \int_0^{t_2} dt_1 g(t_2)g(t_1)\sin[\omega_p(t_2 - t_1)] = \quad (15)$$

$$\sum_{p=1}^{P} \eta_p^i \eta_p^j \int_{\frac{\tau}{2}}^{\tau} dt_2 \int_{\frac{\tau}{2}}^{t_2} dt_1 g(t_2)g(t_1)\sin[\omega_p(t_2 - t_1)] = \chi_{ij}/2.$$

By flipping the phase on the pulse as in Condition 2 and leaving the phase of the spectator ions unchanged, the crosstalk will be suppressed.

Mode Configuration

Figure 7:
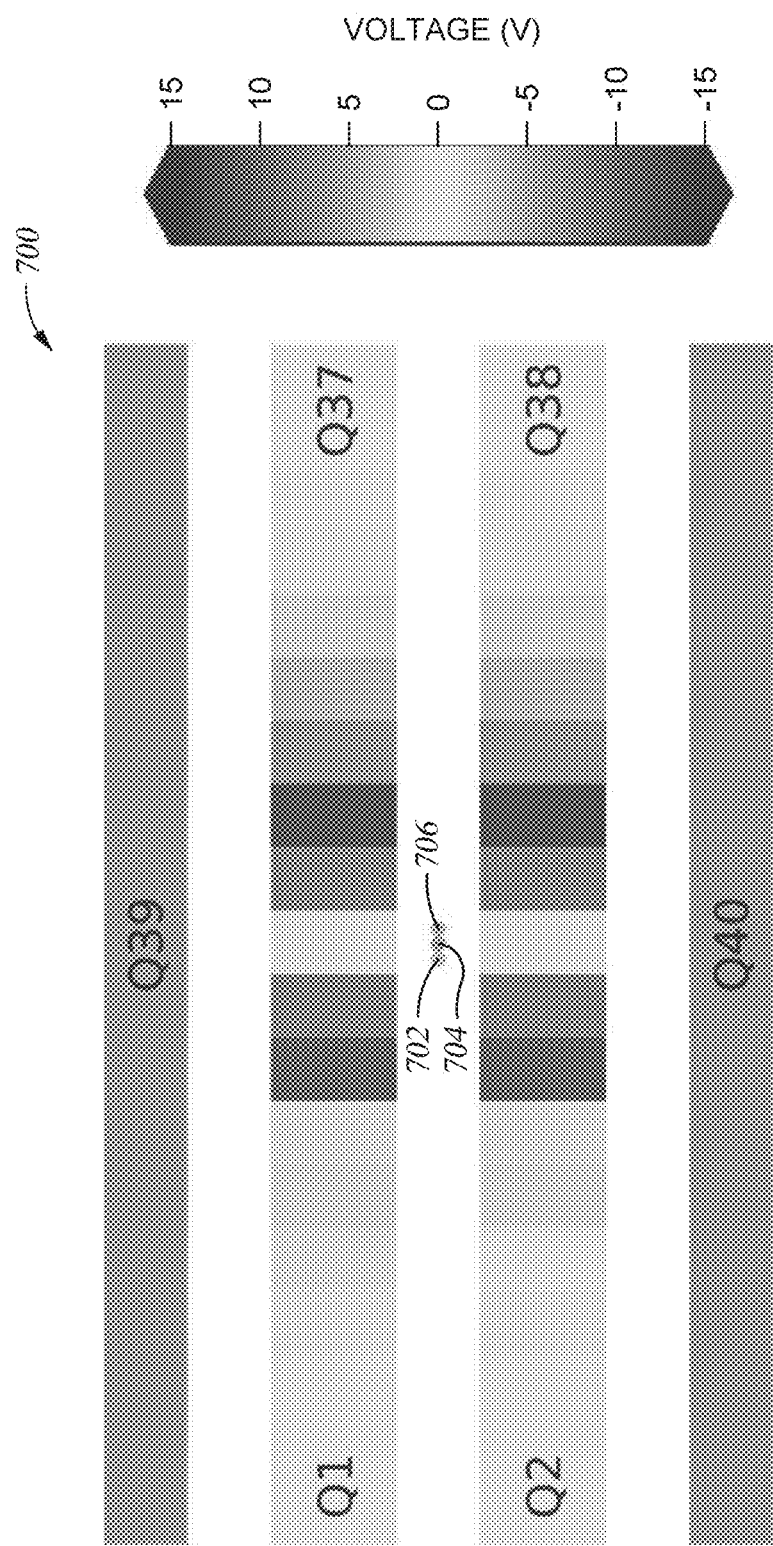
FIG. 7 depicts a numerically computed profie of the static (DC) voltage $V_S$ applied to trap electrodes according to one embodiment.

In the embodiments described herein, an ion trap for confining ions is engineered such that Condition 1 (i.e., the mode frequencies $\omega_p$ are integer multiples of $4\pi/\tau$, $\omega_p=4(k_p+\delta k_p)\pi/\tau$, with a small error $\delta k_p$, where $k_p$ are positive integers and $\tau$ is the gate duration) is satisfied. That is, the static (DC) voltage $V_S$ and the radio frequency (RF) voltage applied to the control electrodes of the ion trap 200 to exert the confining potential are adjusted such that the resulting motional mode structures satisfy Condition 1. FIG. 7 illustrates a numerically computed profie of the static (DC) voltage $V_S$ applied to several electrodes of an example Sandia High Optical Access (HOA) 2.0 trap 700, confining three ions 702, 704, and 706, such that the resulting motional mode structures satisfies Condition 1. In this example ion trap 700, a pulse to construct for performing an XX gate operation is chosen to have the gate duration $\tau=69.466$ μs, and the three motional modes, the center-of-mass (COM) mode, the tilt mode, and the zigzag mode, have the mode frequencies $\omega_p$ corresponding to the positive integers $k_p=97$, 95, and 92, respectively. In the example HOA 2.0 trap 700, the radio frequency (RF) voltage at a frequency of 50.6 MHz is further applied to the trap electrodes, with an amplitude of 289.71 V. The profile of the static (DC) voltage $V_S$ shown in FIG. 7 traps the three ions 702, 704, and 706 linearly aligned in a chain with a spacing of about 4.3 μm above the surface of the ion trap 700 at a distance of about 71 μm. The static (DC) voltage $V_S$ generates a slightly higher radial confinement on the center ion 704 than on the end ions 702 and 704, generating the mode frequencies $\omega_p$ of $2.793\times2\pi$ MHz for the COM mode, $2.735\times2\pi$ MHz for the tilt mode, and $2.649\times2\pi$ MHz for the zigzag mode. These mode frequencies $\omega_p$ deviate slightly from the mode frequencies $\omega_p$ corresponding to the positive integers $k_p=97$, 95, and 92, respectively, that satisfy Condition 1. However, an impact of this deviation (characterized by the error $\delta k_p$) is small, as described below.

Figure 8:
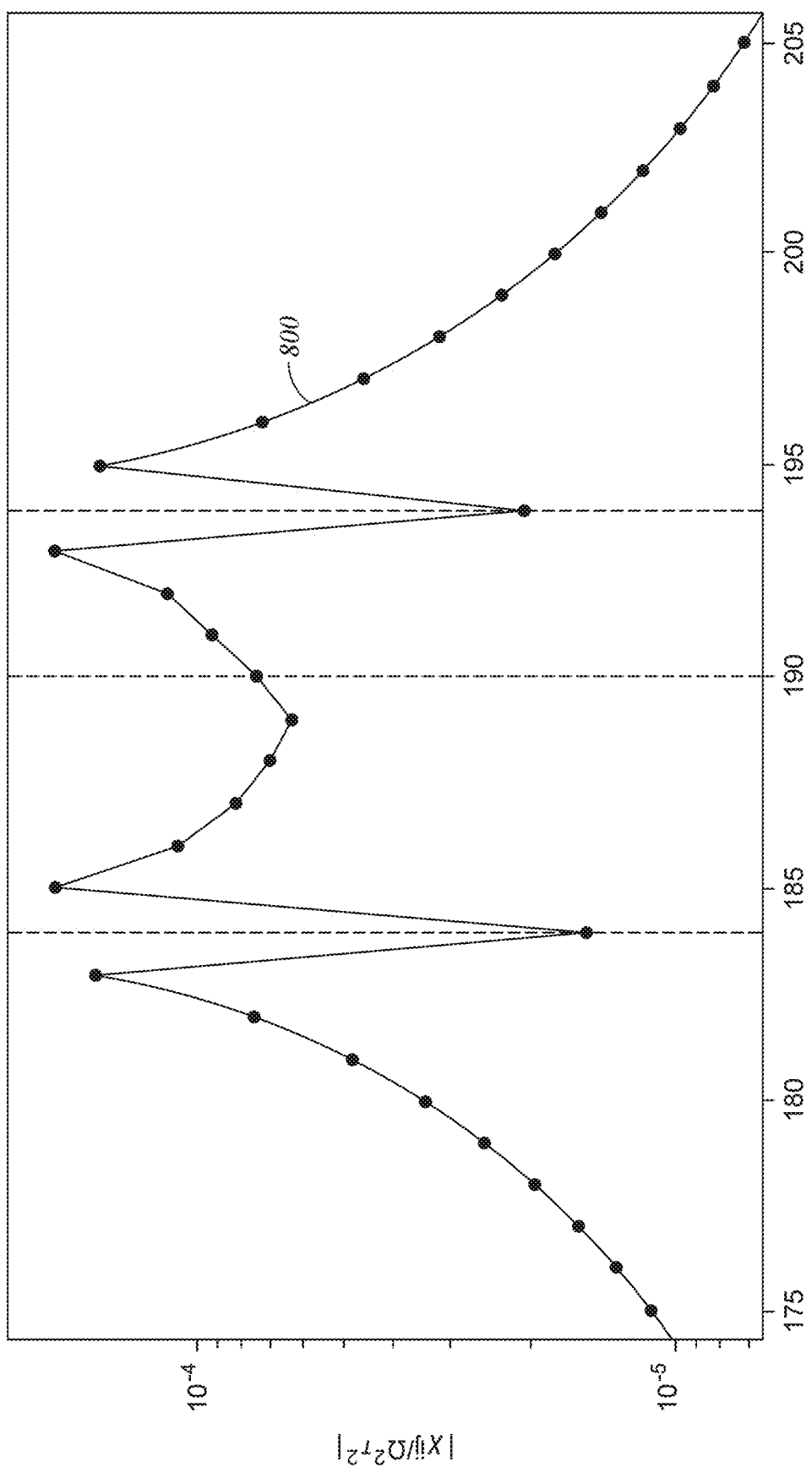
FIG. 8 depicts a numerically computed gate power ratio $|\chi_{ij}/\Omega^2\tau^2|$ according to one embodiment.

FIG. 8 depicts the gate power ratio $|\chi_{ij}/\Omega^2\tau^2|800$ numerically computed for the entangling interaction between the ions 702 and 704 as a function of the positive integer l that determines the detuning frequency $\mu$ as $\mu=2l\pi/\tau$, in the example shown in FIG. 7. The gate power ratio $|\chi_{ij}/\Omega^2\tau^2|$ is maximized (Gate Requirement 2) when the positive integer l is chosen to be 192 if the positive interger l is an even number, and 193 if the positive interger l is an odd number. The pulse with l=192 requires slightly more power with $\Omega/2\pi=0.133$ MHz as compared to 0.101 MHz for the pulse with l=193.

Figure 9A:
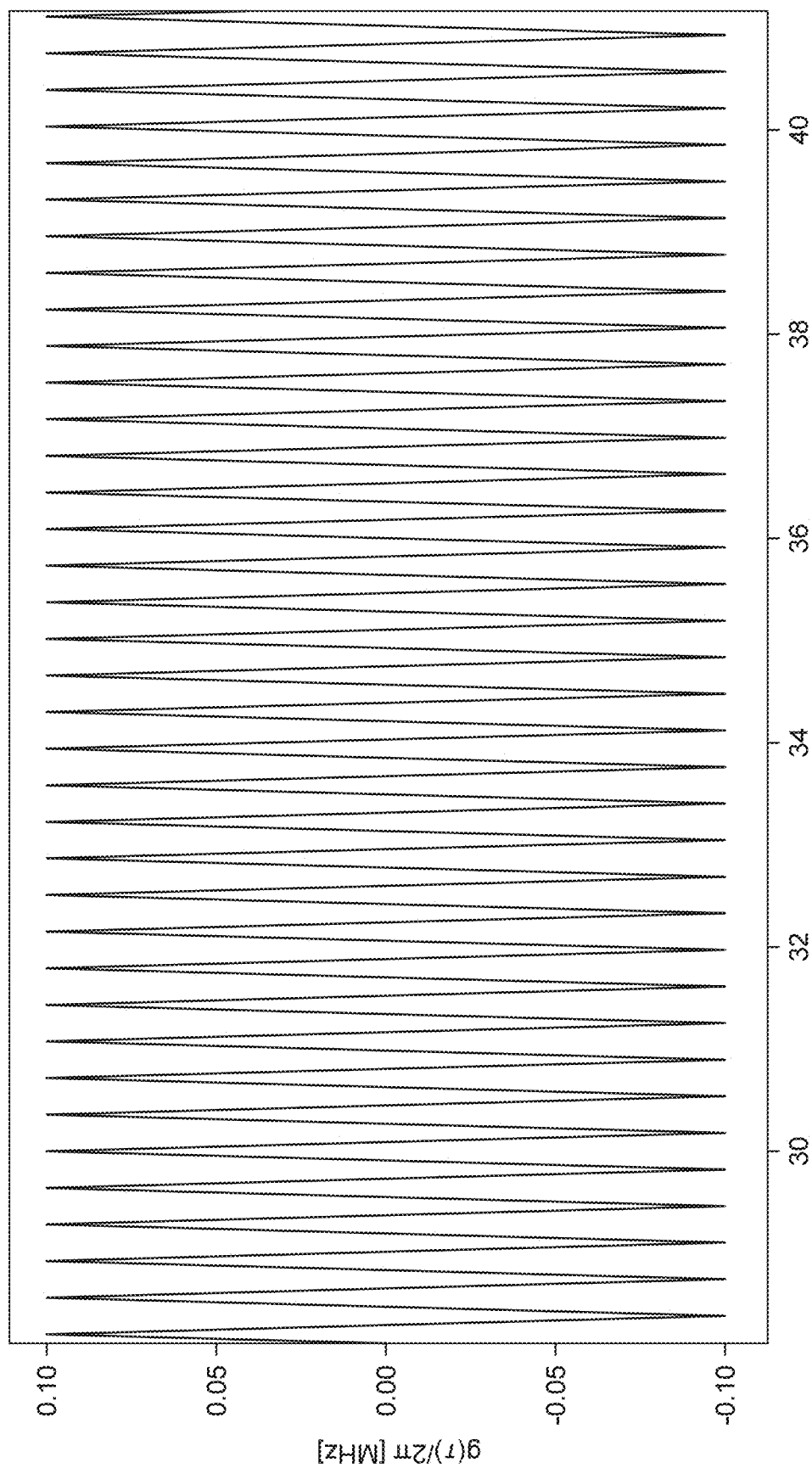
FIGS. 9A and 9B depict numerically computed pulse functions according to one embodiment.
Figure 9B:
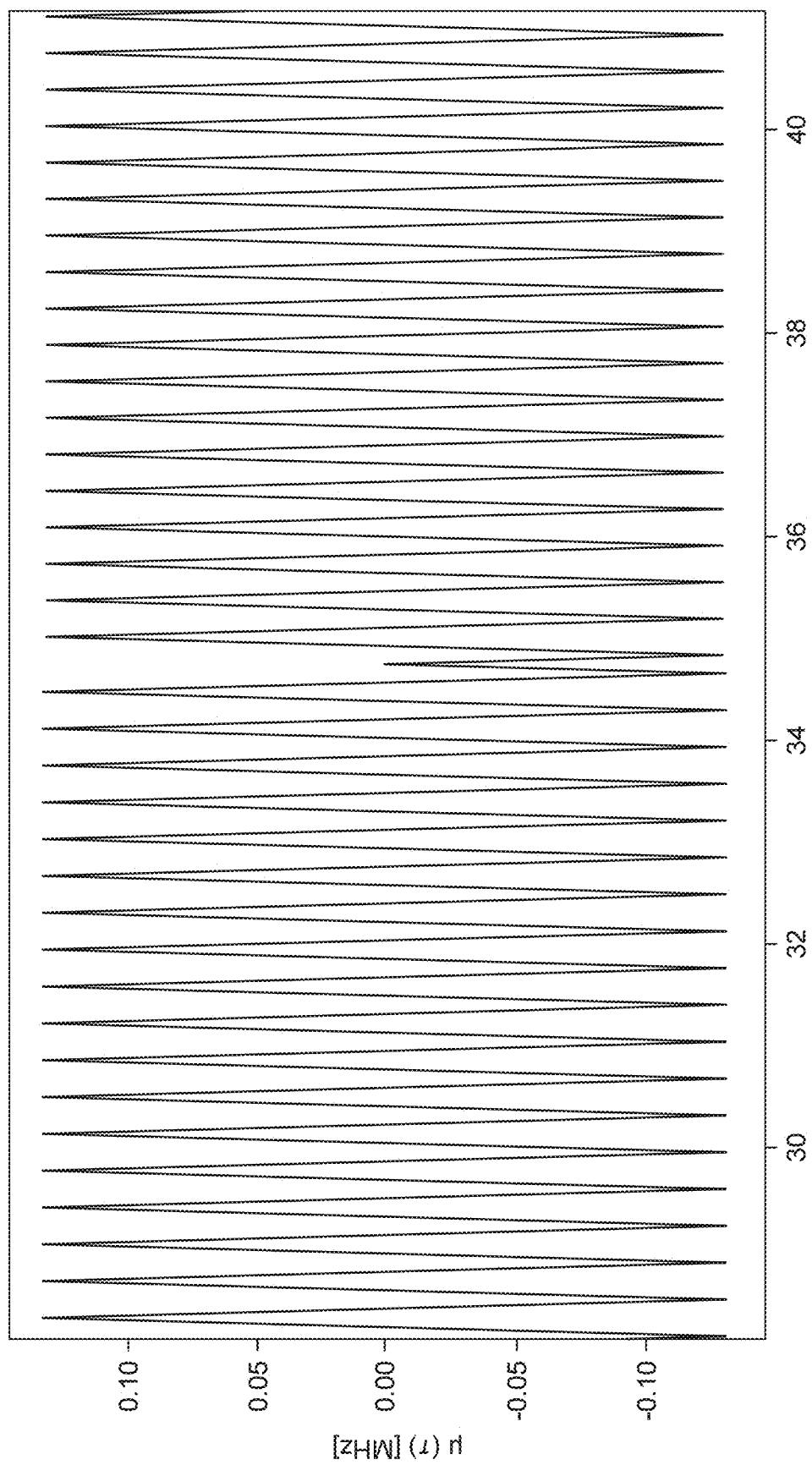

FIGS. 9A and 9B depict the pulse functions g(t) 902 and 904 numerically computed with the selection of the positive integer l, 193 and 192, respectively, in the example shown in FIG. 7. The pulse function g(t) 904 with l=192 in FIG. 9B shows a cusp at a half-way point of the gate duration $\tau=69.466$ μs, which does not exist in the pulse function g(t) 902 with l=193 in FIG. 9A. However, this cusp in the pulse function g(t) 904 with l=192 can be effectively removed by applying appropriate single-qubit gates at the point of the cusp.

Figure 10:
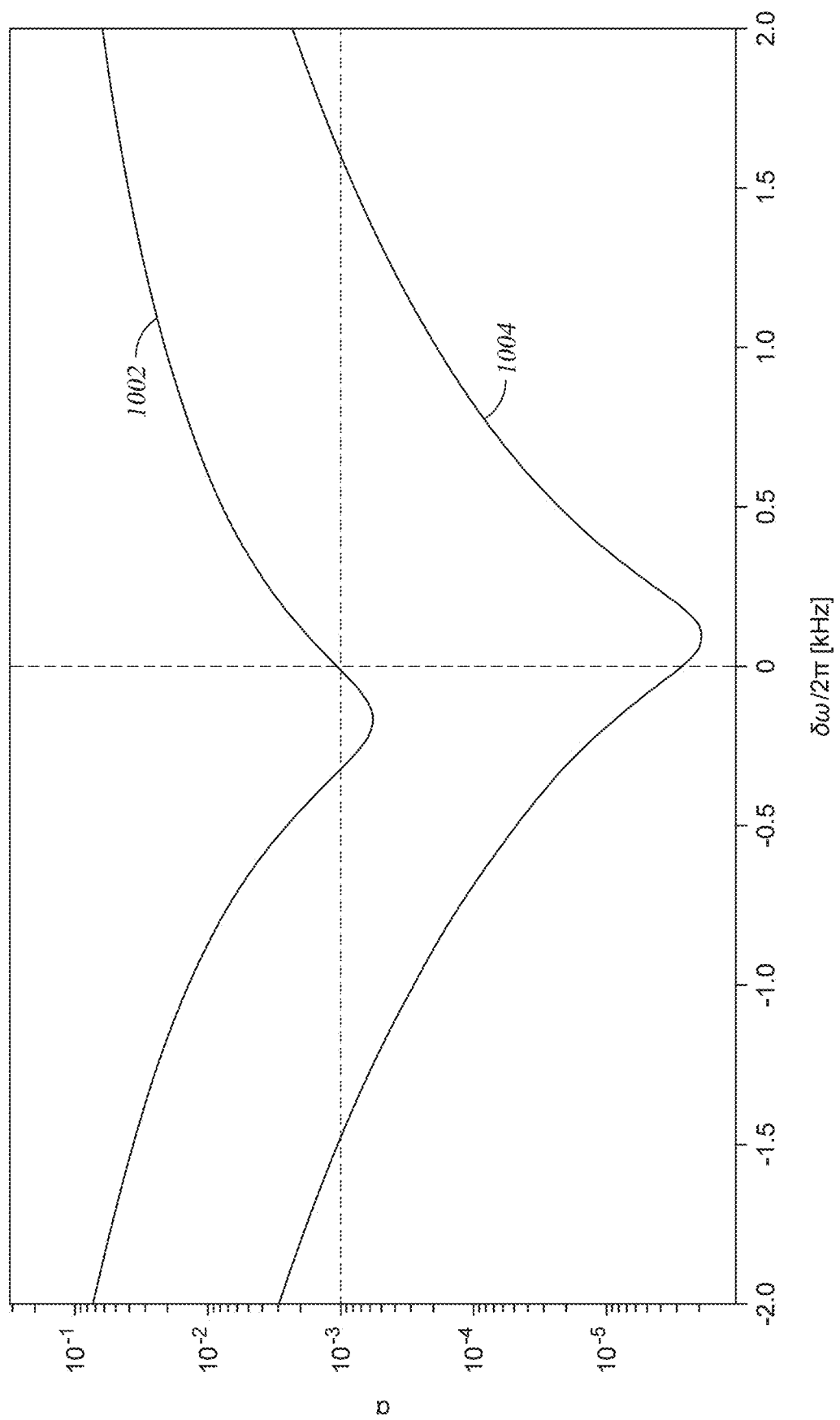
FIG. 10 depicts numerically computed residual couplings a against fluctuation ow in mode frequencies according to one embodiment.

FIG. 10 depicts the residual coupling $\alpha$ numerically computed as a function of fluctuation $\delta\omega$ in the mode frequencies $\omega_p$, in the example shown in FIG. 7. For simplicity, all three motional modes are chosen to have a same frequency fluctuation $\delta\omega$. The residual coupling $\alpha$ 1002 with l=193 and the residual coupling $\alpha$ 1004 with l=192 both include a non-zero value at the frequency fluctuation $\delta\omega=0$ solely due to a static error in the motional mode configuration (i.e., deviations of the mode frequencies $\omega_p$ from the values of the mode frequencies $\omega_p$ that exactly satisfies Condition 1), and a larger non-zero value at the frequency fluctuation $\delta\omega$ of a non-zero value, increased due to hardware errors or noise. The residual coupling $\alpha$ 1004 with l=192 (even) is much smaller than the residual coupling $\alpha$ 1002 with l=193 (odd), owing to the $\delta k_p^4$ dependence of the residual coupling $\alpha$ for even l instead of $\delta k_p^2$ dependence for odd l, as described above. It should be noted that this advantage for an even l over an odd l exists when $l \neq 2k_p$ for any motional mode, as in the case for the example described herein. The trade off is that a pulse with l=192 requires about 30% higher power, compared to a pulse with l=193. A choice between an even l and an odd l should be made on a case by case basis while fully taking the hardware limit into consideration.

FIG. 11 depicts a flowchart illustrating a method 1100 of performing a computation using a quantum computer.

In block 1110, motional mode structures of a plurality of trapped ions are modulated. Each of the plurality of trapped ions having two frequency-separated states defining a qubit.

In block 1120, a detuning frequency function and an amplitude function of a laser pulse are used to cause entangling interaction between a pair of trapped ions of the plurality of trapped ions are computed.

In block 1130, a quantum computation is performed in the quantum computer by applying a laser pulse having the computed detuning frequency function and the amplitude function to the pair of trapped ions for a gate duration.

As described above, in generating a pulse to perform an entangling gate operation between two trapped ions in a chain, control parameters (the detuning frequency function and the amplitude function of the pulse) are determined such that gate requirements are satisfied. In doing so, motional mode structures of trapped ions in the chain are configured such that a constructed pulse is simple and can practically be implemented in speed- and bandwidth-limited hardware. When designing an ion trap that confines ions to modulate the motional mode structures in a desired fashion, electrodes of the ion trap can be structured to provide the desired confining potential. With appropriate technological advancements, an increased number of electrodes and a variety of shapes of the electrodes may be leveraged to induce the desired confining potential. The embodiments described herein provide methods to redistribute the technical complexity that must be overcome to build a practical large-scale quantum computer.

While the foregoing is directed to specific embodiments, other and further embodiments may be devised without departing from the basic scope thereof, and the scope thereof is determined by the claims that follow.

The invention claimed is:

1. A method of performing a computation using a quantum computer, comprising:
    modulating motional mode structures of a plurality of trapped ions, by adjusting a confining potential of an ion trap that traps the plurality of trapped ions, each of the plurality of trapped ions having two frequency-separated states defining a qubit;
    computing a detuning frequency function and an amplitude function of a laser pulse to cause entangling interaction between a pair of trapped ions of the plurality of trapped ions; and
    performing a quantum computation in the quantum computer by applying a laser pulse having the computed detuning frequency function and the amplitude function to the pair of trapped ions for a gate duration.

2. The method according to claim 1, wherein the modulating of the motional mode structures comprises adjusting the confining potential such that motional mode frequencies are integer multiples of $4\pi$ divided by the gate duration.

3. The method according to claim 1, wherein the laser pulse comprises two consecutive pulse segments of the same detuning frequency function and the same amplitude function but with opposite phases.

4. The method according to claim 1, wherein
    the amplitude function of the laser pulse is constant during the gate duration, and
    the detuning frequency function of the laser pulse is an integer multiple of $2\pi$ divided by the gate duration.

5. The method according to claim 1, wherein the computing of the detuning frequency function and the amplitude function of the laser pulse is based on a first gate requirement for non-zero entangling interaction.

6. The method according to claim 5, wherein the computing of the detuning frequency function and the amplitude function of the laser pulse based on a second gate requirement that the laser pulse has a lowest peak-power.

7. The method according to claim 6, wherein the computing of the detuning frequency function and the amplitude function of the laser pulse based on a third gate requirement for ion-mode decoupling for the plurality of trapped ions.

* * * * *